United States Patent [19]

Reichert

[11] Patent Number: 5,330,636
[45] Date of Patent: Jul. 19, 1994

[54] APPARATUS FOR CONTINUOUS RECONDITIONING OF HYDROCARBON FLUIDS

[75] Inventor: Ralph Reichert, Belmont, Calif.

[73] Assignee: Adfiltech Corporation, Alexandria, Va.

[21] Appl. No.: 985,884

[22] Filed: Dec. 4, 1992

[51] Int. Cl.$^5$ .................. B01D 17/12; B01D 36/02
[52] U.S. Cl. ...................... 210/96.1; 184/6.24; 184/108; 210/168; 210/195.1; 210/241; 210/243; 210/DIG. 5
[58] Field of Search ............ 210/96.1, 143, 167, 210/168, 241, 243, 257.1, 259, 295, 323.1, 335, 799, DIG. 5, 171, 195.1; 73/61.43, 61.48; 184/6.24, 108

[56] References Cited

U.S. PATENT DOCUMENTS

| | | | |
|---|---|---|---|
| 3,920,550 | 11/1975 | Farrell et al. | 210/96.1 |
| 4,246,101 | 1/1981 | Selby | 210/96.1 |
| 4,361,488 | 11/1982 | White et al. | 210/168 |
| 4,772,402 | 9/1988 | Love | 210/241 |
| 5,104,529 | 4/1992 | Becker | 210/241 |
| 5,196,117 | 3/1993 | Billiet et al. | 210/DIG. 5 |
| 5,225,073 | 7/1993 | Billiet et al. | 210/DIG. 5 |

FOREIGN PATENT DOCUMENTS 724201 3/1980 U.S.S.R. ............... 210/96.1

*Primary Examiner*—Joseph W. Drodge
*Attorney, Agent, or Firm*—Fisher & Associates

[57] ABSTRACT

Apparatus for the continuous reconditioning of non-conductive hydrocarbon fluids from a system utilizing such fluids includes an arrangement of interconnected filters having at least two different type filters, with means for mechanically and electrically arranging the filters to allow a continuous reconditioning of the fluid with the option of re-refining some selected portions of the fluid. A monitor is provided at the end of at least one of the filtering functions for monitoring the quality of the fluid, and the fluid is automatically rerouted to either a clean reservoir or to recycling.

11 Claims, 2 Drawing Sheets

APPARATUS FOR CONTINUOUS RECONDITIONING OF HYDROCARBON FLUIDS

CROSS-REFERENCE TO RELATED APPLICATIONS

This application is related to U.S. patent application Ser. No. 07/985,817, filed Dec. 4, 1992, for a "Electrostatic Filter for Non-Conductive Liquids," and U.S. patent application Ser. No. 07/985,816, filed Dec. 4, 1992, entitled "Moisture Monitor in a Non-Conductive Liquid Media."

BACKGROUND OF THE INVENTION

1. Field of the Invention

The present invention relates generally to a method and apparatus for filtering oil, and more particularly to a method and apparatus for mechanically and electrically arranging filters to allow a continuous reconditioning of non-conductive hydrocarbon fluids with the selectivity of refining some portions of the fluids.

2. Description of the Prior Art

Many filtering apparatus and systems have been utilized in the past for reconditioning oil. Most of these systems utilize one or two types of filters in series without any particular in-line monitoring of the condition of the fluid being treated.

Furthermore, prior art systems have generally been incapable of directing fluid to be treated to particular filtering devices in response to the detected condition of the fluid.

SUMMARY OF THE INVENTION

It is therefore an object of the present invention to provide an apparatus for mechanically and electrically arranging filters to allow a continuous reconditioning of non-conductive hydrocarbon fluids with the selectivity of refining some portions of the fluids.

It is a further object of the present invention to provide a filtering system for non-conductive hydrocarbon fluids which is automatic and does not require shutdown of a fluid system.

It is a still further object of the present invention to provide a filtering system for non-conductive hydrocarbon fluids which is transportable to a facility having contaminated fluids.

It is a still further object of the present invention to provide a filtering system for non-conductive hydrocarbon fluids which constantly monitors the quality of the fluid being filtered and routes the fluid for further treatment, back to the system or to disposal.

BRIEF DESCRIPTION OF THE DRAWINGS

The invention will be further described in conjunction with the accompanying drawings, in which.

DETAILED DESCRIPTION OF PREFERRED EMBODIMENTS

Figure 1:
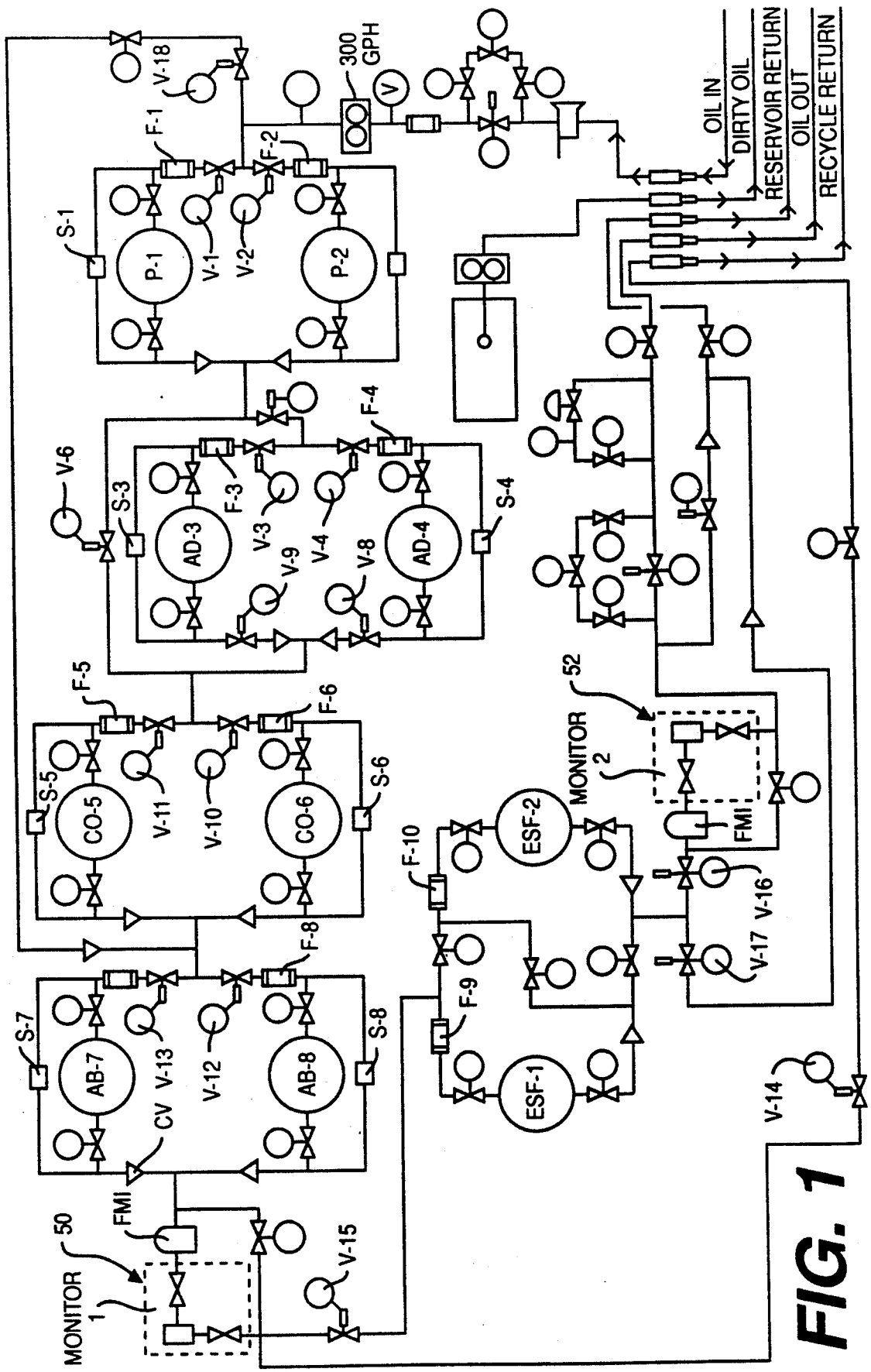
FIG. 1 is a system flow diagram.
Figure 2:
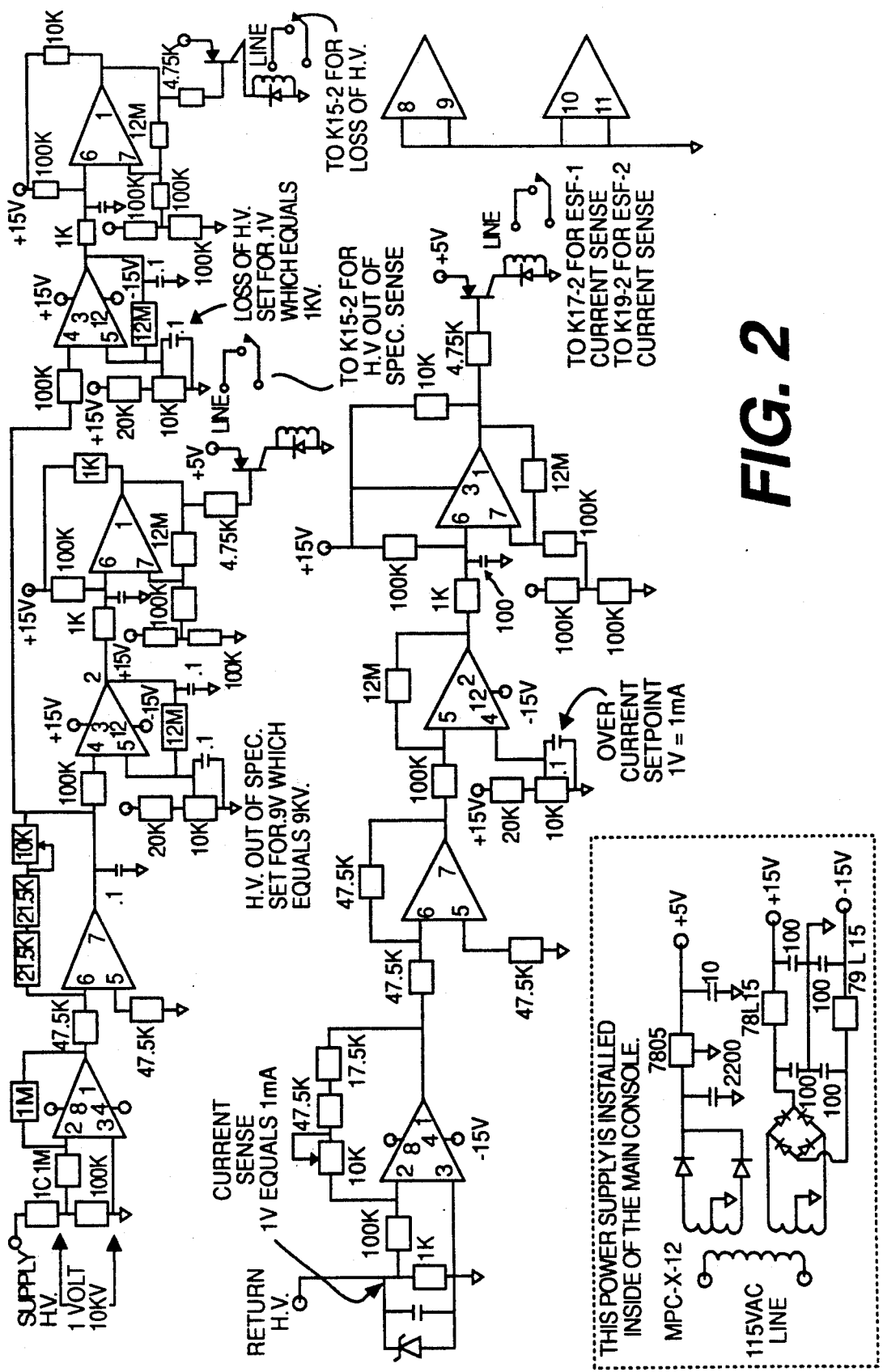
FIG. 2 illustrates a specific electrical schematic circuit for the electrostatic filters designated as ESF-1 and ESF-2 in FIG. 1.

FIG. 1 schematically illustrates five types of filters in a specific grouping and arrangement and an arrangement of flow lines and valves.

Filters designated as P-1 and P-2 are initial particulate filters to remove carbon and heavy materials; filters designated as AD-3 and AD-4 are adsorbing filters to remove colloidal suspensions and acid compounds; filters designated as CO-5 and CO-6 are coalescer filters to remove bulk water; filters designated as AB-7 and AB-8 are finite absorbent filters to remove free and emulsified water; and filters designated as ESF-1 and ESF-2 are electrostatic filters to remove finite particulate materials.

All of the above noted filters are arranged mechanically and electrically to allow a continuous reconditioning of non-conductive hydrocarbon fluids with the selectivity of re-refining some portions of the fluid.

Monitors, such as shown at 50 and 52 are utilized to determine the fluid quality at the end of various stages of filtration such as at the end of the coalescer cycle and electrostatic cycle. The monitored fluid can be automatically routed to a reservoir or recycled or can be returned to a clean reservoir. The monitors prevent contaminated fluid from returning to a clean facility.

The entire unit, including all filters and associated mechanical and electrical equipment can be mounted on a portable base (not shown) to be moved by a vehicle to a location for treatment of fluids.

The system of the present invention further permits the continuous cleaning of fluids, without shutdown, by automatic switching to alternate or companion filter units within the system. Should all alternates be closed, system announces fault and becomes inoperable.

A display panel (not shown) is provided for constant display and monitoring of fluid quality as well as providing a printed record of the effluent.

The system operator has a choice of reconditioning the fluid to take out certain contaminants such as particles and water, or re-refining the fluid to remove solution contaminants such as acid and discolor agents.

The oil processor is a multi stage oil filter processor. It consists of selected filters to recondition used oils by removing moisture and insoluble contaminants, individually and collectively. The processor also is designed to process oils which require limited reclamation by processing with absorption and adsorption media.

The processor requires an operator to select a filtration mode:
recondition or
reclamation The processor is then automatic; routing the fluid as selected through the various filters, and switching to alternate filters as a filter cartridge becomes saturated. The processor will continue to process fluid in the mode selected by the operator until the dirty oil reservoir is depleted.

The control panel (not shown) is designed to provide a map type visual routing of flow path through the processor with maintenance indication and location. An LCD display of residual moisture content of the processed fluid is verified and recorded by a tape printer.

In order to obtain reliable performance from the processor, the following variables and features are herein described:

The viscosity, temperature and types of fluids that may be processed.

The function of the laboratory physical test and spectrochemical analysis and the importance of such a report in the operation of the processor.

An explanation of the operating modes and the functional performance of the components.

The electrostatic filter and its contribution to the overall performance of the processor.

The moisture monitor as a measurement device.

To enable the operator to determine the proper mode, reconditioning, reclaiming or both, of insulating or lubricating oil, several factors must be considered:
a. Cost and availability of new oil.
b. Equipment maintenance and amortization.
c. Laboratory costs.
d. Loss of oil during reprocessing.
e. Cost of inhibitors and cost of blending.

Most utilities will have their own opinion, cost data and quality control involved in the reconditioning and reclaiming of oil; all dependent on type of turbine system or quantity and storage facility in the case of insulating oil. Most utilities have some form of inplant reconditioning equipment which may include some or all of the following; filters' centrifuges and vacuum dehydrators. Reclaiming facilities in some plants would include adsorbent means, percolation through clays and other chemical wash techniques.

The "all in one" availability of equipment in the present invention and minimum time required for complete processed fluid illustrate some of the advantages.

Insulating oil, turbo-generator oil, diesel oil, specifically, actually any hydrocarbon oil within the range of viscosity and temperature limitations indicated below, may be processed in all operational modes.

The system does not function as an in-line filter, that is, to remove or reduce a single contaminant, but rather is an arrangement of filters designed to remove various levels of specific contaminant individually and as a group.

It is imperative that an analysis of the used fluid to be processed be obtained before processing to enable the operator to select the proper mode of reconditioning or reclaiming.

Prior to processing fluid in the processor, a laboratory analysis must be obtained to determine the contaminant levels present in the available fluid. The analysis is to, as a minimum, include the content in the fluid of four basic contaminants:

Specific gravity, water, acid number and particulate.

There are definitely other tests that a utility may require to determine when an oil requires processing, but these four contaminants have the largest influence on the overall oil serviceability. The volumetric content of the latter three contaminants will be significantly reduced in the processor.

Another major contaminant in all oils is air and other gasses of oxidation. This contaminant can only be removed with a vacuum processor.

The analysis report will provide total water amount in the oil sample. Water in liquids, unlike water in gasses have individual and distinct saturation concentrations at a given temperature. This fact is very important to the processor operator, since what might appear to be a small quantity content in one oil type could easily represent a saturation content in another oil.

Water is present in oil in three separate phases. Free, emulsified or suspended, dissolved water in solution. Dissolved water is not readily discernible in a sample, depending on concentration. Since water saturation values in a liquid vary, a familiarity with the saturation values of the various fluids to be processed must be acquired in order to determine the optimum mode of processor operation. If the percentages (PPM) quantities reported by the analysis represent excessive values for the processor, or a specified water content is required, then other types of processors would be recommended to the utility to satisfy this requirement.

Several operation modes are available to the operator:

The average mode includes fluid passage through the complete filtration complement with fluid exit from the discharge hose. The average mode provides oil reclamation facility.

The standard mode includes fluid passage through all filters, except the reclamation facility. This mode is the standard reconditioning facility and discharges through the discharge hose.

The recycle A mode, a reclamation mode, provides the facility to reclaim an entire reservoir and then, pass the fluid through either the standard or average mode to a final discharge location. Fluid discharge is from the designated recycle hose.

The recycle W mode, a reconditioning mode, allows a reservoir to flow through the processor removing contaminant concentrations and then if desired pass the entire reservoir through standard or average modes to a clean reservoir. Discharge from the recycle W mode is through the recycle hose.

The special mode, a reconditioning mode, provides a facility to process diesel oil or new oil through an absorptive filter and the electrostatic filter only. Discharge is from the discharge hose. The purge mode is reserved for processor maintenance. A purge fluid is directed to all filter housings, with fluid level controlled by manual back pressure controller, BP-1.

With exception of the Purge Mode, selection by the operator depends to a large extent on the experience of the operator with the processor, that is, its capabilities and limitations, the condition of the filter elements, and the result desired by the operator, or anticipated by the utility. And, perhaps, most important the sampling procedure and accurate of both the pre and final analysis.

Generally, there are few alternatives to reclamation if the fluid is in poor condition and the analysis indicates acid content increasing accompanied by a significant water content. The average mode may reduced an acid content of 0.08 to 0.01 mg KOH/g in a single pass. Therefore, if acid reduction is intended and the acid number is 0.09 select average mode. Higher initial values may indicate the use of recycle A. Since the acid reduction media, diatomaceous (Fuller's) earth also performs as a molecular sieve, quantities of dissolved water will also be removed.

The standard mode, a reconditioning mode evolves around low water content to medium water content. An analysis report of 300 PPM would suggest standard mode operation, as an example.

Alternatively, Recycle W, may be selected if moisture content exceeded these values. Water content in the fluid above the amount set out as maximum, would not be processed.

As stated above these limits are intended as initial data points; the operators experience will set the proper thresholds.

The operation of the processor begins with the selection of the mode. With the selector at average and depressing the start button, PB-1, activates the main pump motor. Air is vented automatically form the filter by the vent valve on top of the filter housing. Flow is directed form the initial filter, P-1 to filter AD-3, an adsorbent filter. As flow passes through the filter air is automatically vented form the housing.

From AD-3 flow is introduced to housing CO-5, coalescer/separator, and air is automatically vented from the housing. From CO-5 flow is directed to filter AB-7, the absorbent section of the processor.

During flow progression from P-1 through and including AB 7, should flow be impeded due to contaminate loading of a cartridge, flow is automatically directed to the redundant filter. If a maintenance light is illuminated on the redundant filter, indicating both filter cartridge of the series are loaded, then flow will cease.

At this juncture, with flow in both the average and standard modes, the flow is reviewed by Monitor #1, if moisture content is over 20% of saturation concentration, the fluid is not allowed to proceed but is returned to reservoir for reprocessing. Fluid is directed back to reservoir through the hose connection recycle. This rejection is automatic and is corrected as flow returns to an acceptable moisture saturation value.

From acceptance by Monitor #1 flow proceeds to the electrostatic filters.

Flow that has completed passage through the ESF filtration group, enters the inspection chamber of moisture Monitor #2. If the percentage of moisture concentration indicates a dissolved water content, equal to or less than Monitor #1, the fluid leaves the processor through the hose labeled, discharge.

In the event, during operation, that the voltage is lost or "low" high voltage occurs, fluid is returned to reservoir and not discharge.

In the standard mode, the reclamation facility, AD-3(AD-4) is bypassed. Flow continues from the initial filter P-1 to the CO-5 coalescer and proceeds completely as described above exiting through the "discharge" hose.

In the "recycle A" mode, flow proceeds identically as described above for the average mode, but is directed at the Monitor #1 junction to hose labeled "recycle".

In the "recycle W" mode, flow proceeds as described for the standard mode. At the junction of Monitor #1, flow is directed to the reservoir exiting through the hose labeled "recycle". In all modes, (except purge) filters will automatically switch to the redundant filter as a filter cartridge becomes loaded.

In the special mode, fluid enters the system as previously described through the initial filter, P-1, and is then directed to absorptive filter, AB-7. The process through Monitor #1, the electrostatic filter and discharge functions are all as described above for "standard" and "average".

In the purge mode, fluid is allowed to flow through all housings to remove all contaminant from the piping and the filter housings, thus, all cartridge elements are removed from their respective housings. The housings are re-sealed and a distillate, diesel fluid or clean, light oil is set up as the inlet fluid.

Manually operated ball valve, BP-1 should be at half flow position; ball valve, SO-21 is full open; ball valves BP-4 and BP-S are closed, temporarily to permit a maximum of 65 PSIG back flush pressure in the system. Regulation of back pressure is by modulation of the valves and the drain system. Drain is through the sump drain and/or all hose openings.

The electrostatic filter is a specific purpose type filter, designated to remove particulate contaminants form the fluid stream. The electro-mechanical principles which govern its performance are detailed elsewhere and are protected by pending patents.

A D.C. signal recorder provides a documented record of moisture content. The printer documents only processed fluid discharged by the automatic discharge valve (ADV) and hence is recording when this valve controls the flow. The visual display is constant. If during operation the visual display becomes distorted or illegible, the recorder will continue.

The processor of the present invention can remove solid particulate matter as well as those particles acting as carriers of water; also free and emulsified water from oil. It can reduce limited amounts of the dissolved water content from oil.

The full reclaiming facility can restore the oil so that it has most of its original characteristics, but his has no effect upon restoring the usefulness of the natural oil inhibitors. To restore the oil to a desirable condition oxidation inhibitors may be added to extend the life of reclaimed fluid.

Moisture concentration is probably the most significant contaminant encountered in insulating or lubricating liquids, whether that liquid is a mineral oil or a synthesized oil. This discussion will not address the problems associated with water content and low dielectric values in insulating oil, or plot the deteriorating effect in turbine oil, but rather indicate the effective employment of a sensor probe and a microprocess electronics module to continuously calculate saturation concentration at a given temperature. The moisture monitor is such a device and is included on the system to enable an operator to monitor and measure the quantity of this contaminant in the discharge fluid.

The analysis report will express moisture level in parts per million by, weight $PPM_w$.

All gasses have the same concentration of moisture vapor at a given temperature; however, each liquid has a different, individual vapor concentration level at a given temperature.

The importance of this fact is; what might appear to be a low moisture content in one liquid could easily represent a saturation condition in another liquid. To the operator, the first liquid could represent turbine oil and the second liquid may have been hydraulic oil.

For the processor operator to view the laboratory analysis and read 50 PPM on one fluid and 500 PPM on another fluid and decide which value represents a modest water content and which is a high moisture content for that fluid would require several years of practical and some formal training academically. Many commercial oils have moisture content data available by the manufacturer.

The water content at 100% relative humidity is often referred to as the saturation concentration of water vapor at a given temperature or the solubility of water in a liquid, $C_o$.

If temperature is held constant, the water content at another relative humidity is determined by combining the value at 100% by the desired relative humidity's percent with the value at 100%. For example, the water content of a liquid at 50% relative humidity is found by multiplying the solubility (water content at 100% relative humidity) by 0.5.

The moisture monitor is programmed to calculate in percent of moisture concentration thus viewing the moisture content as a percent of saturation of any fluid and consequently, enabling the operator to evaluate water concentration as either low, based on lesser percent, or high, based on an increased percentage.

For instance, consider insulation oil, much data is available on this highly refined product. Saturation concentration at 100 degrees F. is 125 PPM. If this fluid was being processed by the system and a processor readout of 40%, was displayed, would indicate that the moisture content, at process temperature, is 60% below saturation. Conversely, a readout of 70% would indicate the fluid is only 30% below the full saturated value of that fluid. The type, brand, viscosity of the oil being processed is not relevant. The operator is presented with immediate information enabling the selection of continued processing or proceeding to discharge.

The moisture monitor will automatically reprocess the fluid until a pre-set concentration is achieved or until the maximum performance is reached by the processor.

Assuming a high differential pressure exists across filter AD-3, the process operation flow would be automatically directed to AD-4. Field servicing would require the inlet and outlet manual ball valves to be closed; the drain valves, also manual ball valves, opened. All drains are pre-piped to the base mounted internal sump reservoir. Drain of this reservoir is automatically controlled by a float valve switch which activates the sump pump which directs the waste, through the sump hose to a dirty oil barrel or reservoir.

The operator can now remove the contaminated filler cartridges and replace with new elements in accordance with the manufacturers instructions.

The filter housing begins to vent air into the housing through the automatic air vent on top of the housing simultaneously with fluid being extracted through the sump hose. When replacement filter cartridges are installed, drains are closed, inlet and outlet valve are returned to the open position. The sump reservoir pump ceases operation as the liquid level in the reservoir is reduced.

In the standard mode AIV valve energizes (NO)V-5 valve and starts pump motor. Flow is directed through (NO)V-1 valve to the P-1 filter. Flow continues through (NO)V-6 valve and (NO)V-11 valve; CO-5 filter indicator is displayed. From CO-5, flow proceeds through (NO)V-13 valve into AB-7 filter. Flow is directed through the Monitor #1 chamber. The monitor either rejects the oil quality, with (NC)V-14 valve, returning fluid to reservoir or, accepts the fluid quality (NC)V-15 valve, routing fluid to ESF-1 and ESF-2 filter housings. Flow passes F-9 and F-10 flow valves, entering the Electrostatic Filters. After a 10 second delay; the high voltage circuit is energized and (NC)V-16 valve is energized. Flow proceeds to the final #2 monitor chamber. The monitor either opens (NC)ADV valve routing fluid to the clean oil reservoir or the fluid is directed by (NO)V-19 valve to the directly oil reservoir. At this time the printer is also activated, recording the moisture content.

In the average mode the following valves are energized: (NO)V-6, (C)V-13 and (NC)V-9. Depressing the start switch energizes (NC)AIV and starts the pump motor directing flow through (NO)V-1 and through filter P-1. Flow continues through (NO)V-5, valve and the energized (NC)V-3 permitting flow to the adsorbent filter AD-3. Flow continues through the energized I(NC)V-9 through (NO)V-11 and into filter CO-5. From CO-5 flow is directed through (NO) valve V-13 and into filter AB-7. From AB-7 flow enters the moisture monitor and is processed and controlled as described above.

The following modes use a portion of the circuit logic of the above two modes to enable a single, contaminated reservoir to be cleaned by recirculation through a portion of either standard or average modes as indicated by analysis or operator discretion. The high voltage circuit is not activated with recycle selection modes.

In the recycle A mode the first monitor is electrically bypassed, and (NC)V-14 valve is energized and the average circuit is activated. Thus depressing the start switch will activate the (NC)AIV, start the pump motor and direct the flow through filters P-1, AD-3, CO-5 and into the AD filter; returning the fluid to the reservoir through the energized (NO)V-14 valve.

In the recycle W mode the (NC)V valve is energized and the initial monitor is electrically bypassed. The standard circuit is activated to activate the AIV valve, the pump motor and flow proceeds as in the "Standard" setting entering P-1 and the TO-5 the AB-7 and exiting the system through V-14.

In the special mode valves (NO)V-i, (NC)V-18 are energized. Flow is directed through valve V-18 thus bypassing the P-1, AD-3, CO-5 filters and entering the system through valve (NO)V-13 and proceeding through AB-7. From filter AB-7 the monitor directs the flow to the ESF filters as described above, for standard mode, exiting the system through valve ADV.

In the purge mode all elements are removed form filters and all exit lines, are connected to waste tank. A manual back pressure valve, BP-1, is installed after valve V-18 to permit flow simultaneously through the main system and the auxiliary special route. Manual valve, SO-21, is opened to allow flow through the pressure regulating valve. Manual valves BP-4 and BP-5 are closed to allow pressure differential of 50# to be set at the pressure regulating valve. BP-1, BP-4 and BP-5 may now be partially opened to permit flow through these lines. The purge switch energizes all (NC) valves except AIV. Also as in other modes, the start switch will activate the AIV valve and the pump motor.

In the optional mode for ESF filters the electrostatic filters may be operated in a series flow pattern; before making a mode selection on the selector switch, manual operating valves OP-1 and 3 are closed and OP-2 is opened.

In all flow selections, except were identified, flow passes valve V-1 and flow switch F-1. Flow continues to flow through filter P-1 until high differential pressure switch, S-1, indicates a 15# differential pressure across this filter energizes NO valve V-1 and NC valve V-2 permitting flow to be directed to alternate filter P-2.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. Apparatus arranged for the continuous reconditioning of non-conductive hydrocarbon fluids from a system utilizing said fluids comprising:
    an arrangement of interconnected filters having separate inlets and comprising at least two different type filters, the interconnected filters including at least one filter means for removing water from said non-conductive hydrocarbon fluids, means for mechanically and electrically arranging said interconnected filters to allow a continuous reconditioning of said non-conductive hydrocarbon fluids with optional re-refining of selected portions of said fluids;

means for monitoring the moisture content of said fluids following their passage through said arrangement; and means responsive to said monitoring for automatically and selectively rerouting said fluids to ether a clean reservoir or to recycling to said arrangement of interconnected filters.

2. Apparatus according to claim 1 wherein said arrangement of interconnected filters comprises:

at least one initial particulate filter for removing heavy materials, and wherein said at lest one filter means for removing water comprises at least one finite absorbent filter for removing water in emulsion.

3. Apparatus according to claim 2 further comprising:

at lest one absorbing filter for removing colloidal suspensions.

4. Apparatus according to claim 2 wherein said at least one filter means for removing water further comprises:

at least one coalescer filter for removing bulk water.

5. Apparatus according to claim 4 further comprising:

at least one adsorbing filter for removing colloidal suspensions.

6. Apparatus according to claim 2 further comprising:

at least one electrostatic filter for removing finite particulate materials.

7. Apparatus according to claim 6 wherein said at least one filter means for removing water further comprises:

at least one adsorbing filter for removing colloidal suspensions.

8. Apparatus according to claim 6 wherein said at least one filter means for removing water further comprises:

at lest one coalescer filter for removing bulk water.

9. Apparatus according to claim 8 further comprising:

at least one adsorbing filter for removing colloidal suspensions.

10. Apparatus according to claim 1 wherein all mechanical and electrical components of said apparatus are mounted on a base member capable of being moved by a vehicle for use on-site.

11. Apparatus according to claim 1 further comprising:

a panel for constantly displaying and monitoring of the quality of said fluid as well as providing a printed record.

* * * * *